United States Patent [19]
Vorbruggen et al.

[11] 3,817,980
[45] June 18, 1974

[54] 5-AZAPYRIMIDINE NUCLEOSIDES

[75] Inventors: Helmut Vorbruggen; Ulrich Niedballa, both of Berlin, Germany

[73] Assignee: Schering Aktiengesellschaft, Berlin, Germany

[22] Filed: Mar. 12, 1971

[21] Appl. No.: 123,836

[30] Foreign Application Priority Data
Mar. 14, 1970 Germany............................ 2012888

[52] U.S. Cl............................. 260/211.5 R, 424/180
[51] Int. Cl........................................... C07d 51/52
[58] Field of Search................... 260/211.5, 211.5 R

[56] References Cited
UNITED STATES PATENTS

| | | | |
|---|---|---|---|
| 3,328,388 | 6/1967 | Shen et al. | 260/211.5 R |
| 3,346,561 | 10/1967 | Boxer et al. | 260/211.5 R |
| 3,350,388 | 10/1967 | Sorm et al. | 260/211.5 R |
| 3,531,464 | 9/1970 | Ryan et al. | 260/211.5 R |

*Primary Examiner*—Johnnie R. Brown
*Attorney, Agent, or Firm*—Millen, Raptes & White

[57] ABSTRACT
5-Azapyrimidine nucleosides of the formula

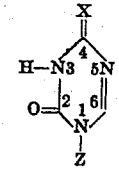

wherein X is NH or an oxygen atom and Z is a free or blocked sugar residue having cytotoxic, antiviral, enzyme-inhibiting, immunosuppressive, anti-inflammatory and antipsoriatic activity are prepared by the reaction in the presence of a Lewis acid, of a 1-O-acyl-, 1-O-alkyl- or 1-holoderivative of a blocked sugar with a compound of the general formula

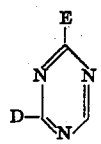

wherein D is a silylated or alkylated O-group and E is a silylated or alkylated O- or NH-group, the blocking groups of the sugar residue thereafter optionally being split off in a conventional manner to produce the corresponding free nucleoside.

11 Claims, No Drawings

5-AZAPYRIMIDINE NUCLEOSIDES

BACKGROUND OF THE INVENTION

It is known that 1-glycosyl-5-azacytosines possess cancerostatic and virostatic activity (Experientia 24, 922 [1968] and Cancer Res. 28, 1995 [1968]).

5-Azacytidine is produced, in accordance with German Pat. No. 1,245,384, from the expensive and sensitive 2,3,5-tri-O-acetyl-β-D-ribofuranosylisocyanate via three stages. In a recently published work (J. Org. Chem. 35, 491 [1970]), the direct glycosidation of the silylated 5-azacytosine according to the Hilbert-Johnson reaction (J. Amer. Chem. Soc. 52, 4489 [1930]) is described. However, according to this method, the 5-azacytidine is obtained in very poor yields, and 2'-deoxy-5-azacytidine is produced only in traces. The protected nucleosides could not be obtained in pure form.

In contrast thereto, it has now been found that 2,4-bis-O-alkyl and 2,4-bis-silyl derivatives of 5-azauracil and 5-azacytosine can be converted very readily and in good yields by the process of this invention by reaction with a blocked sugar derivative to form the protected, i.e., blocked, 5-azapyrimidine nucleosides which can then be converted into the corresponding free nucleosides by saponification.

SUMMARY OF THE INVENTION

The novel compounds of this invention are 5-azapyrimidine nucleosides of the general Formula I

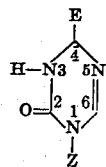

wherein X is NH or an oxygen atom and Z is a free or blocked sugar residue. They are prepared according to the process of this invention by the reaction in the presence of a Lewis acid, of a 1-O-acyl-, 1-O-alkyl- or 1-halo-derivative of a blocked sugar with a compound of the general Formula II

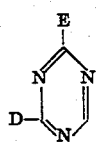

wherein D is a silylated or alkylated O-group and E is a silylated or alkylated O- or NH-group, the blocking groups of the sugar residue thereafter optionally being split off in a conventional manner to produce the corresponding free nucleoside.

DETAILED DISCUSSION

Compounds of this invention are those of Formula I wherein (a) X is an oxygen atom and Z is ribosyl, ribofuranosyl, glucosyl, arabinofuranosyl, glucopyranosyl, allosyl, arabinosyl, fructopyranosyl, galactofuranosyl, galactopyranosyl, mannopyranosyl, rhamnopyranosyl, sorbopyranosyl, xylopyranosyl and the corresponding 0-acylated compounds,
e.g., wherein Z is:
2,3,5,6-tetra-O-benzoyl-D-allosyl,
2,3,5-tri-O-benz yl-D-arabinosyl,
tetra-O-acetyl-β-D-fructopyranosyl,
tetra-O-acetyl-D-fructofuranosyl,
tetra-O-acetyl-β-D-galactofuranosyl,
tetra-O-acetyl-β-D-galactopyranosyl,
2,3,4,6-tetra-O-acetyl-glucopyranosyl,
2,3,5,6-tetra-O-acetyl-glucofuranosyl,
2,3,4,6-tetra-O-acetyl-β-D-mannopyranosyl,
2,3,4-tri-O-benzoyl-rhamnopyranosyl,
1,3,4,5-tetra-O-acetyl-sorbopyranosyl,
2,3,4-tri-O-acetyl-xylopyranosyl,
and (b) the compounds corresponding to each of the above wherein X is NH.

The sugar reactants employed in the process of this invention are those having in the one-position a halogen atom, e.g., Cl, a carboxyester group or an O-ether group. Examples of monosaccharide reactants are those in which the sugar moiety is ribose, 2-deoxyribose, glucose, arabinose, allose, fructose, galactose, galactosamine, mannose, rhamnose, sorbose, xylose, glucosamine.

Sugar moieties of particular importance are those of ribose, deoxyribose, arabinose, and glucose. Desirably, all the free hydroxy groups of the sugar moieties are masked. Suitable sugar masking groups are the blocking groups conventionally employed in sugar chemistry, including ester and ether groups, such as, for example, acetyl and other alkanoyl groups, benzoyl and other aroyl groups, e.g., p-chlorobenzoyl, p-nitrobenzoyl and p-toluyl, and cleavable ether groups, e.g., a benzyl group.

The method of preparing the halogenated blocked sugars is conventional, e.g., reacting the sugar with an alcohol in the presence of acid, protecting the free OH-groups with a suitable blocking group and forming the halogen-sugar by treatment with anhydrous hydrogen halide in an organic solvent, e.g., ether, acetic acid.

The protected halogenosugars are prepared by the methods, described in W. W. Zorbach, R. S. Tipson: Synthetic Procedures in Nucleic Acid Chemistry, Vol. 1, Interscience Publishers, 1968, or see in: Advances in Carbohydrate Chemistry, Vol. 10 Academic Press, p. 247–249, 251–253, 1955.

Examples of halogenated blocked sugars are:
2,3,5,6-tetra-O-benzoyl-D-allosylchloride,
2,3,5-tri-O-benz yl-D-arabinosylbromide,
tetra-O-acetyl-β-D-fructopyranosylchloride,
tetra-O-acetyl-D-fructofuranosylchloride,
tetra-O-acetyl-β-D-galactofuranosylchloride,
tetra-O-acetyl-α-D-galactopyranosylchloride,
2,3,4,6-tetra-O-acetyl-glucopyranosylchloride,
2,3,5,6-tetra-O-acetyl-glucofuranosylchloride,
2,3,4,6-tetra-O-acetyl-α-D-mannopyranosylchloride,
2,3,4-tri-O-benzoyl-rhamnopyranosylchloride,
1,3,4,5-tetra-O-acetyl-sorbopyranosylchloride,
2,3,4-tri-O-acetyl-xylopyranosylchloride.

If a nucleoside having a sugar residue blocked by an O-acyl blocking group are desired as the final product, in addition to the abovementioned masking groups, the masking group can be the acyl group of, e.g., propionic acid, caproic acid, enanthic acid, undecylic acid, oleic acid, pivalic acid, cyclopentylpropionic acid, phenylacetic acid or adamantanecarboxylic acid.

The starting triazines can be produced employing conditions described in: Silylation of Organic Compounds, Pierce Chemical Company, Rockford, Ill., 1968, pp. 18–26 and in Chem. Pharm. Bull. 12 (1964) 352 and Z. Chem. 4 (1964) 303.

Preferred specific silylation reactants include for example trimethylchlorosilane with bases as pyridine, triethylamine or other tertiary amines, or with ammonia; hexamethyldisilazane with an acid catalyst as trimethylchlorosilane, ammonium salts, sodium bisulfate; N-silylated amines like trimethylsilylmethylamine, trimethylsilylaniline, trimethylsilyldiethylamine, trimethylsilylimidazole, silylated amides like N, O-bis-trimethylsilylacetamide, N-trimethylsilyl-N, N'-diphenylurea and N-trimethylsilylphthalimide.

Examples of silylated starting compounds for the process of this invention are those of Formula IIa:

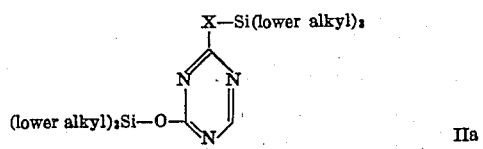

IIa wherein X is -O- or -NH-. Of these, especially preferred are those wherein the lower-alkyl group, which can contain one to four carbon atoms, is methyl. These compounds are prepared by reacting 2,6-dioxy-5-azapyrimidine or 2-oxy-6-amino-5-azapyrimidine with a hexa-alkyl, preferably hexa-lower-alkyl, disilazane, e.g., hexamethyl-disilane, or with a trialkyl, preferably tri-lower-alkyl, silyl halogenide, e.g., trimethylsilyl chloride. Of the starting compounds, the bis-trimethylsilyl ethers are preferred.

The best yields are obtained in the process of this invention when E and D are both alkylated groups or both silylated groups, i.e., when E is an alkylated O-group, D is preferably an alkylated O-group, and when E is a silylated NH-group, D is preferably a silylated O-group.

The Lewis acid employed in the reaction is preferably soluble in the reaction solvent. Examples of preferred Lewis acids are tin tetrachloride, titanium tetrachloride, zinc chloride, and boron trifluoride etherate. Examples of other Lewis acids are silver perchlorate and mercury halides.

The reaction can be conducted in the customary inert organic solvents, e.g., in methylene chloride, chloroform, ethylene chloride, acetone, dioxane, tetrahydrofuran, dimethylformamide, benzene, toluene, carbon disulfide, carbon tetrachloride, tetrachloroethane, chlorobenzene and ethyl acetate.

The reaction can be conducted at room temperature of at higher or lower temperatures, preferably 10°–60° C. The reactants are generally employed in the reaction in approximately equimolar amounts. However, the pyrimidine compound can be utilized in a small excess in order to obtain as close to quantitative conversion of the sugar component as possible.

For producing the free nucleosides of this invention, i.e., compounds of Formula I wherein Z is a free sugar residue, the blocking groups can split off in a conventional manner, e.g., with an alcoholic solution of ammonia or an alcoholate. In the reaction with ammonia, an O-alkyl group present in the four-position on the triazine ring is converted to an NH-group.

The course taken by the novel process of this invention was not predicted and is highly surprising because it is known that triazine compounds of the above-described type are very unstable in both the acidic and basic pH range.

The 5-azapyrimidine nucleosides of this invention possess cytotoxic, antiviral, enzyme-inhibiting, immunosuppressive, anti-inflammatory, and antipsoriatic activity. They can be administered in the same manner as the known 1-glycosyl-5-azacytosines. 5-Azapyrimidine nucleosides having a blocked sugar residue, i.e., compounds of Formula I wherein Z is a blocked sugar residue, are particularly suitable, due to their high resorbability for topical application, e.g., in the form of solutions, salves, and gels.

The compounds produced by the process of this invention possess cytotoxic, antiviral, enzyme-inhibiting, immunosuppressive, anti-inflammatory, and antipsoriatic properties.

Because the compounds of this invention can be employed in vitro as well as in vivo, they are especially useful as disinfectants, e.g., in the sterilization of medical instruments and the like, as well as in cleansing solutions for cleaning woodwork, towels, linen, blankets, dishes and the like, to prevent spread of infection.

The novel compounds of this invention can be employed in mixture with conventional pharmaceutical excipients. Carrier substances can be such organic or inorganic substances suitable for parenteral, enteral, or topical application, and which, of course, do not deleteriously react with the novel compounds, such as, for example, water, vegetable oils, polyethylene glycols, gelatin, lactose, amylose, magnesium stearate, talc, vaseline, cholesterol, etc.

For parenteral application, particularly suitable are solutions, preferably oily or aqueous solutions, as well as suspensions, emulsions or implants. Ampoules are convenient unit dosages.

For enteral application, particularly suitable are tablets or dragees which are also characterized by talc and/or a carbohydrate carrier or binder or the like, the carbohydrate carrier being preferably lactose and/or corn starch and/or potato starch. A syrup or the like can also be used wherein a sweetened vehicle is employed.

For topical application, viscous to semi-solid forms are used such as liniments, salves or creams, which are, if desired, sterilized, or mixed with auxiliary agents, such as preservatives, stabilizers, or wetting agents, or salts for influencing the osmotic pressure, or with buffer substances.

The substance of this invention is generally administered to animals, including, but not limited to, mammals and avians, e.g., cattle, cats, dogs, and poultry.

A daily dosage comprises about 1 to 40 g. active compound of this invention on oral administration and a 5 percent greasy ointment on topical administration. In general, the mg/kg ratio is preferably about 50 to 500 mg. per kg. of body weight. The dose can be administered once per day or in increments throughout the day.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

Preparation of the bissilyl compound of 5-azacytosine:

11.2 g. of 5-azacytosine, 100 ml. of hexamethyldisilazane and 1.5 ml. of trimethylchlorosilane were boiled for 15 hour under reflux conditions. Then, all low-boiling components (up to 125° C./760 torr) were distilled off, and the residue was distilled in a bulb tube, thus obtaining, in quantitative yield (25.6 g.), 2-trimethylsilyloxy-4-trimethylsilylamino-1,3,5-triazine. Preparation of 2.4-dimethoxy-1,3,5-triazine:

15 g. of 2,4-dimethoxy-6-chlor-1,3,5-triazine (The Chemistry of Heterocyclic Compounds, S-Triazines, page 71/72) were hydrogenated in the presence of 4.6 g. of Pd (5 percent)/C in a solution of 500 ml of abs. ether and 12 ml. of abs. triethylamine until the take up of one equivalent of hydrogen. After filtration from the solid, the solution was evaporated. The residue was recrystallized from about 150 ml. of n-hexane. The yield of crystalline 2,4-dimethoxy-1,3,5-triazine was 5.3 g., m. p. 48°–52° C.

EXAMPLE 1

1-(2',3',5'-Tri-O-benzoyl-β-D-ribofuranosyl)-2-oxo-4-amino-1,2-dihydro-1,3,5-triazine 12.5 millimols of the bissilyl compound of 5-azacytosine in 18.8 ml. of absolute dichloroethane was added to a solution of 5.0 g. of 1-O-acetyl-2,3,5-tri-O-benzoyl-ribofuranose (9.92 mmol) in 100 ml. of absolute dichloroethane. Then, the reaction mixture was mixed with 1.68 ml. of $SnCl_4$ (14.4 mmol) in 20 ml. of absolute dichloroethane, and the mixture was stirred for 2 hours at room temperature. After dilution with 200 ml. of methylene chloride, the reaction mixture was washed with an $NaHCO_3$ solution. The organic phase was filtered through kieselguhr, the latter having been washed with a small amount of methylene chloride. The combined organic solutions were dried over $Na_2SO_4$ and evaporated under vacuum. The residue was dissolved in toluene and filtered over kieselguhr in order to remove 5-azacytosine. Final remainders were eliminated by filtering the ethanolic solution over kieselguhr.

Crystallization from ethanol yielded the nucleoside in the form of colorless needles.

Yield: 3.85 g. (69.8 percent of theory), m.p. 186°–187° C.

EXAMPLE 2

1-(2',3',4',6'-Tetra-O-acetyl-β-D-glucopyranosyl)2-oxo-4-amino-1,2-dihydro-1,3,5-triazine 12.5 millimols of the bissilyl compound of 5-azacytosine in 18.8 ml. of absolute dichloroethane was added to a solution of 3.9 g. of pentaacetyl glucose (10 mmol) in 100 ml. of absolute dichloroethane. After the addition of 1.68 ml. of $SnCl_4$ (14.4 mmol) in 20 ml. of absolute dichloroethane, the reaction mixture was agitated for 3 hours at room temperature.

Then, the mixture was diluted with 200 ml. of methylene chloride and worked up as described in Example 1. The 5-azacytosine was removed by filtering the ethanolic solution of the residue over kieselguhr. Crystallization from acetone/toluene resulted in the nucleoside, in the form of colorless needles.

Yield: 2.42 g. (54.7 percent of theory), m.p. 210°–212° C.

EXAMPLE 3

1-(2'-Deoxy-3',5'-di-O-p-toluyl-β-D-ribofuranosyl)-2-oxo-4-amino-1,2,-dihydro-1,3,5-triazine 12.5 millimols of the bissilyl compound of 5-azacytosine in 18.8 ml. of absolute dichloroethane was added to a solution of 3.9 g. of 2-deoxy-3,5-di-O-p-toluyl-ribofuranosyl chloride (10 mmol) in 100 ml. of absolute dichloroethane. After the addition of 0.84 ml. of $SnCl_4$ (7.2 mmol) in 10 ml. of absolute dichloroethane, the reaction mixture was agitated for 2 hours at room temperature, then diluted with 200 ml. of methylene chloride, and worked up as described in Example 1. By filtration of the residue in a solution of toluene/ethanol over kieselguhr, the 5-azacytosine was removed. An α,β-mixture was crystallized from toluene; this mixture was recrystallized from ethanol.

Yield: α,β-mixture: 3.55 g. (76.6 percent of theory).

The β-anomer was obtained in the pure form by fractional crystallization from ethyl acetate.

Yield: 1.93 g. (41.6 percent of theory), m.p. 196° C.

EXAMPLE 4 a. 1-(2',3',4',6'-Tetra-O-acetyl-β-D-glucopyranosyl)-2-oxo-4-methoxy-1,2-dihydro-1,3,5-triazine 1.55 g. of 2,4-dimethoxy-1,3,5-triazine (11 mmol) was added to a solution of 3.9 g. of pentaacetyl glucose (10 mmol) in 100 ml. of absolute dichloroethane. After the addition of 1.68 ml. of $SnCl_4$ (14.4 mmol) in 20 ml. of absolute dichloroethane, the reaction mixture was stirred for 3 hours at room temperature. After dilution with 200 ml. of methylene chloride, the mixture was worked up as set forth in Example 1.

The nucleoside was crystallized from ethanol in the form of colorless needles. Yield: 1.73 g. (37.8 percent of theory), m.p. 236°–237° C.

b. 1-[β-D-Glucopyranosyl]-5-azacytosine 1.5 g. of 1-[2',3',4',6'-Tetra-O-acetyl-β-D-glucopyranosyl]-2-oxo-4-methoxy-1,2-dihydro-1,3,5-triazine (3.28 mmol) was dissolved in 50 ml. of absolute methanol saturated with ammonia, and the reaction mixture was stirred for 3 hours at room temperature. The solvent was then evaporated under vacuum, and the residue was divided between ethyl acetate and water. The aqueous phase was concentrated under vacuum and the residue recrystallized from moist methanol.

Yield: 487 mg. (54.2 percent of theory), m.p. 259°–261° C. (decomposition).

c. 1-[β-D-Glucopyranosyl]-5-Azauracil 1.12 g. of 1-[2',3',4',6'-Tetra-O-acetyl-β-D-glucopyranosyl]-2-oxo-4-methoxy-1,2-dihydro-1,3,5-triazine (2.45 mmol) in 50 ml. of absolute methanol was mixed with a solution of 146 mg. of sodium (6.35 mmol) in 50 ml. of absolute methanol. The mixture was stirred for 0.5 hour at room temperature, then mixed with 20 g. of an ion exchanger in the $H^+$-form, and agitated for another 2 hours at room temperature. The exchanger was filtered off and the mixture washed thoroughly with moist methanol. The combined solutions were evaporated to dryness under vacuum. The nucleoside was crystallized from moist methanol in the form of colorless needles.

Yield: 363 mg. (53.8 percent of theory), m.p. 182°–185° C. (the substance is present as a solvate).

EXAMPLE 5

1-(2',3',4'-Tri-O-acetyl-β-D-ribopyranosyl)-2-oxo-4-amino-1,2-dihydro-1,3,5-triazine 12.2 millimols of the bissilyl compound of 5-azacytosine in 18.8 ml. of absolute dichloroethane was added to a solution of 3.18 g. of tetraacetyl ribopyranose (10 mmol) in 100 ml. of absolute dichloroethane. After the addition of 1.68 ml. of $SnCl_4$ (14.4 mmol) in 20 ml. of absolute dichloroethane, the mixture was stirred for 2 hours at room temperature. After dilution with 200 ml. of methylene chloride, the reaction mixture was worked up as described in Example 1. The nucleoside was purified by chromatography on silica gel. The product was crystallized from ethanol in colorless needles.

Yield: 1.92 g. (51.9 percent of theory), m.p. 128°–136° C. (the substance is present as a solvate).

EXAMPLE 6

5-Azacytidine 1.5 g. of 5-azacytidine tribenzoate (2.7 mmol) was dissolved in 100 ml. of absolute methanol saturated with ammonia, and then agitated for 8 hours at room temperature. The solvent was thereafter removed by evaporation under vacuum, and the residue was distributed between ethyl acetate and water. The aqueous phase was concentrated under vacuum. The residue was crystallized from moist methanol.

Yield: 509 mg. (77.5 percent of theory), m.p. 232°–233° C. (decomposition).

EXAMPLE 7

1-(β-D-Glucopyranosyl)-5-azacytosine 1.6 g. of 1-(tetraacetyl-glucopyranosyl)-5-azacytosine (3.62 mmol) was dissolved in 100 ml. of absolute methanol saturated with ammonia and agitated for 3 hours at room temperature. The reaction mixture was worked up as described in Example 6. Crystallization from moist methanol yielded colorless needles.

Yield: 734 mg. (73.9 percent of theory), m.p. 257°–259° C. (decomposition).

EXAMPLE 8

2'-Deoxy-5-azacytidine 1.40 g. of 1-(2'-deoxy-3,5-di-O-p-toluyl-β-D-ribofuranosyl)-5-azacytosine (3.02 mmol) was dissolved in 50 ml. of absolute methanol saturated with ammonia and stirred for 3 hours at room temperature. The reaction mixture was worked up as set forth in Example 6. The nucleoside was crystallized from ethanol.

Yield: 495 mg. (70.4 percent of theory), m.p. 198°–199° C. (decomposition).

EXAMPLE 9

1-(β-D-Ribopyranosyl)-5-azacytosine 0.6 g. of 1-(2',3',4'-tri-O-acetyl-β-D-ribopyranosyl)-5-azacytosine (1.62 mmol) was dissolved in 100 ml. of absolute methanol saturated with ammonia and stirred for 3 hours at room temperature. The reaction mixture was worked up as described in Example 6. The nucleoside was crystallized from moist methanol.

Yield: 298 mg. (75.2 percent of theory), m.p. 160° C. (decomposition; the substance is present as the solvate).

The preceding examples can be repeated with similar success by substituting the generically and specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A 5-azapyrimidine nucleoside of the formula

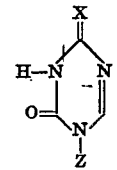

wherein X is NH or an oxygen atom and Z is a monosaccharide residue wherein at least one of the hydroxy groups is masked with a member selected from the group consisting of acetyl, benzoyl, p-chlorobenzoyl, p-nitrobenzoyl, p-toluyl and benzyl.

2. A compound of claim 1 wherein X is NH.

3. A compound of claim 1 wherein X is an oxygen atom.

4. A compound of claim 1 wherein the monosaccharide residue is selected from the group consisting of ribose, deoxyribose, arabinose and glucose.

5. A compound of claim 1 wherein all of the free hydroxy groups of the monosaccharide residue are masked.

6. A compound of claim 1, 1(2',3',5'-tri-O-benzoyl-β-D-ribofuranosyl)-2-oxo-4-amino-1,2-dihydro-1,3,5-triazine.

7. A compound of claim 3, 1-(2',3',4',6'-tetra-O-acetyl-β-D-glucopyranosyl)-2-oxo-4-amino-1,2-dihydro-1,3,5-triazine.

8. A compound of claim 3, 1-(2'-deoxy-3',5'-di-O-p-toluyl-β-D-ribofuranosyl)-2-oxo-4-amino-1,2-dihydro-1,3,5-triazine.

9. A compound of claim 3, 1-(2',3',4'-tri-O-acetyl-β-D-ribopyranosyl)-2-oxo-4-amino-1,2-dihydro-1,3,5-triazine.

10. A process for the preparation of 5-azapyrimidine nucleosides of the formula

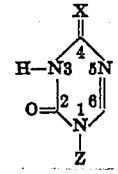

wherein X is NH or an oxygen atom and Z is a blocked sugar residue which comprises reacting in the presence of a Lewis acid the 1-O-acyl-1-O-alkyl- or 1-halo-derivative of a blocked sugar with a compound of the formula

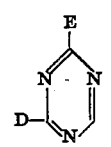

wherein D is a silylated or alkylated O-group and E is a silylated or alkylated O- or NH-group to form said 5-azapyrimidine nucleoside.

11. A process according to claim 10 wherein the Lewis acid is tin tetrachloride, titanium tetrachloride, zinc chloride or boron trifluoride etherate.

* * * * *

UNITED STATES PATENT OFFICE
CERTIFICATE OF CORRECTION

PATENT NO. : 3,817,980
DATED : June 18, 1974
INVENTOR(S) : H. Vorbruggen et al

It is certified that error appears in the above-identified patent and that said Letters Patent are hereby corrected as shown below:

Column 8, line 52, change "sugar" to --monosaccharide--.

line 54, change "sugar" to --monosaccharide--.

Signed and Sealed this ninth Day of September 1975

[SEAL]

Attest:

RUTH C. MASON
Attesting Officer

C. MARSHALL DANN
Commissioner of Patents and Trademarks